United States Patent
De Vos et al.

(10) Patent No.: US 11,675,884 B2
(45) Date of Patent: Jun. 13, 2023

(54) AUTHENTICATION OF A PERSON USING A VIRTUAL IDENTITY CARD

(71) Applicant: IDEMIA THE NETHERLANDS B.V., Haarlem (NL)

(72) Inventors: Jouri De Vos, Haarlem (NL); Joost Van Prooijen, Haarlem (NL); Vincent Bouatou, Issy-les Moulineaux (FR); Cyril Wattebled, Issy-les Moulineaux (FR)

(73) Assignee: IDEMIA THE NETHERLANDS B.V., Haarlem (NL)

( * ) Notice: Subject to any disclaimer, the term of this patent is extended or adjusted under 35 U.S.C. 154(b) by 241 days.

(21) Appl. No.: 16/755,336

(22) PCT Filed: Oct. 10, 2018

(86) PCT No.: PCT/NL2018/050669
§ 371 (c)(1),
(2) Date: Apr. 10, 2020

(87) PCT Pub. No.: WO2019/074366
PCT Pub. Date: Apr. 18, 2019

(65) Prior Publication Data
US 2020/0311237 A1 Oct. 1, 2020

(30) Foreign Application Priority Data
Oct. 10, 2017 (NL) ..................................... 2019698

(51) Int. Cl.
*G06F 21/00* (2013.01)
*G06F 21/32* (2013.01)
(Continued)

(52) U.S. Cl.
CPC .............. *G06F 21/32* (2013.01); *G06V 40/70* (2022.01); *H04L 9/3231* (2013.01); *H04L 9/3297* (2013.01); *H04L 63/0861* (2013.01)

(58) Field of Classification Search
CPC ....... G06F 21/32; G06V 40/70; H04L 9/3231; H04L 9/3297; H04L 63/0861
(Continued)

(56) References Cited

U.S. PATENT DOCUMENTS

2003/0099379 A1 5/2003 Monk et al.
2003/0115459 A1 6/2003 Monk
(Continued)

FOREIGN PATENT DOCUMENTS

DE 10 2014 100463 7/2015
WO WO 2017/142407 8/2017

OTHER PUBLICATIONS

Thaddeus Ng, Multi-Factor Authentication Using Biometric and Gesture Based Input (Year: 2015).*
(Continued)

*Primary Examiner* — Andrew J Steinle
(74) *Attorney, Agent, or Firm* — Nixon & Vanderhye

(57) ABSTRACT

A method and system for authenticating a user based on a human-recognizable visual representation of biometric data of the user is captured using the digital camera, wherein a biometric feature descriptor is generated from the captured biometric data of the user, and the feature descriptor, together with a user selected user profile, is transmitted to an inspection server adapted for validating whether the transmitted biometric feature descriptor corresponds to a centrally stored biometric feature descriptor of biometric data of the user. If this is the case, the inspection server transmits an
(Continued)

Figure 1A:
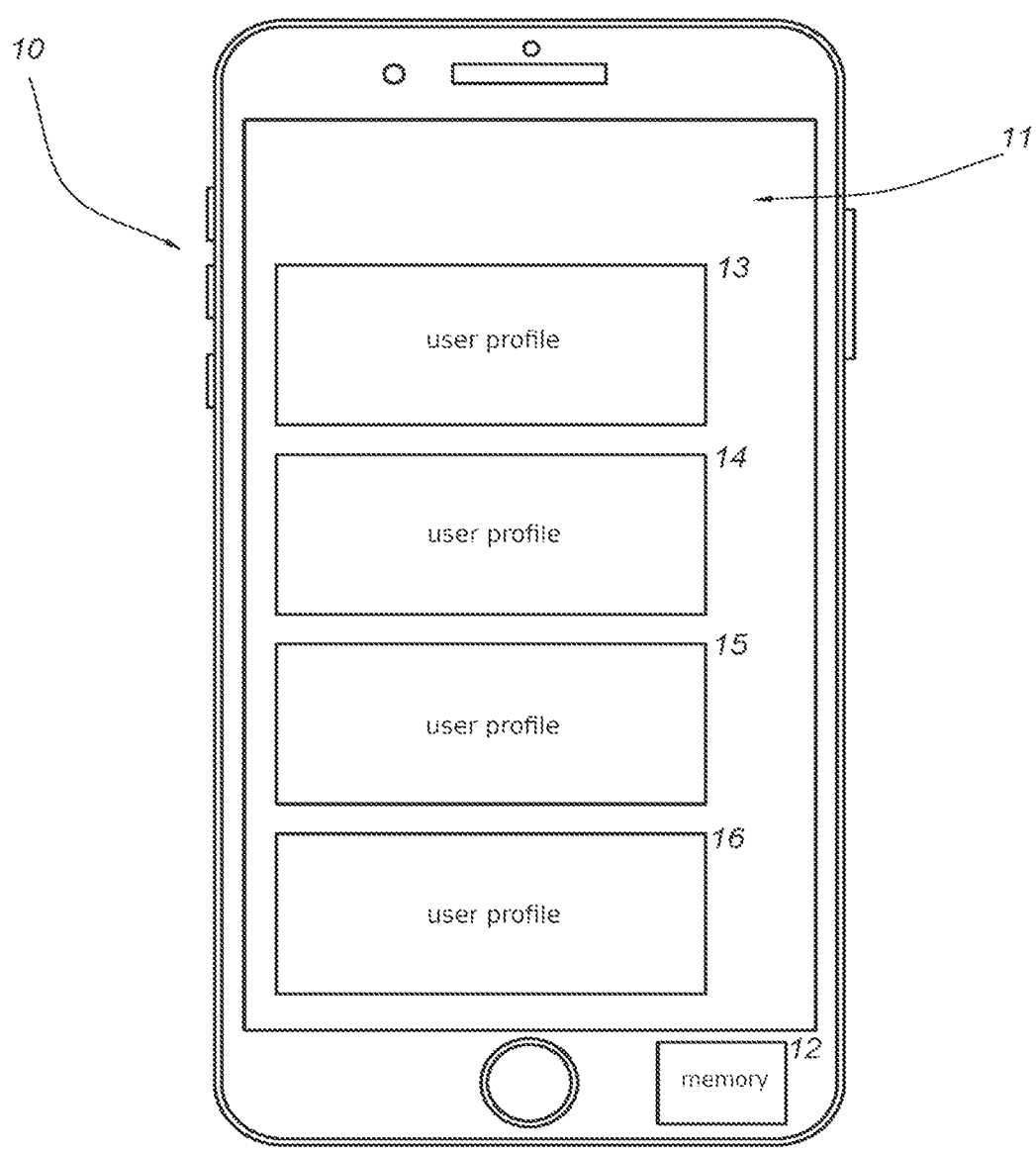

"authentication approved" signal together with user personalization data specified in the selected user profile to the inspection terminal.

22 Claims, 8 Drawing Sheets

(51) Int. Cl.
*H04L 9/32* (2006.01)
*H04L 9/40* (2022.01)
*G06V 40/70* (2022.01)

(58) Field of Classification Search
USPC .......................................................... 713/186
See application file for complete search history.

(56) References Cited

U.S. PATENT DOCUMENTS

| | | |
|---|---|---|
| 2009/0132813 A1 | 5/2009 | Schibuk |
| 2011/0089233 A1* | 4/2011 | Locher .................. H04L 9/3231 235/380 |
| 2011/0145904 A1 | 6/2011 | Pizano et al. |
| 2013/0133086 A1* | 5/2013 | Liberman ................ G09C 5/00 726/28 |
| 2013/0243266 A1 | 9/2013 | Lazzouni |
| 2015/0086088 A1* | 3/2015 | King ....................... G06V 40/16 382/118 |
| 2016/0239653 A1* | 8/2016 | Loughlin-Mchugh ...................... G06F 21/35 |

OTHER PUBLICATIONS

International Search Report, PCT/NL2018/050669, dated Feb. 11, 2019.
Written Opinion, PCT/NL2018/050669, dated Feb. 11, 2019.
"Chapter 10: Identification and Entity Authentication ED—Menezes A J; Van Oorschot P C; Vanstone SA", Handbook of Applied Cryptography; [CRC Press Series On Discrete Mathematices and Its Applications], CRC Press, Boca Raton, FL, US, pp. 385-424, Oct. 1, 1996 (Oct. 1, 1996), XP001525010, ISBN: 978-0-8493-8523-0, Retrieved from the Internet:URL:http://www.cacr.math.uwaterloo.ca/hac/Section 10.5.
Communication pursuant to Rule 114(2) EPC issued in European Patent Application No. 18812342.6 dated May 25, 2022.
Denning and Sacco, "Timestamps in Key Distribution Protocols," Communications of the ACM, Aug. 1981, vol. 24, No. 8, pp. 533-536.

* cited by examiner

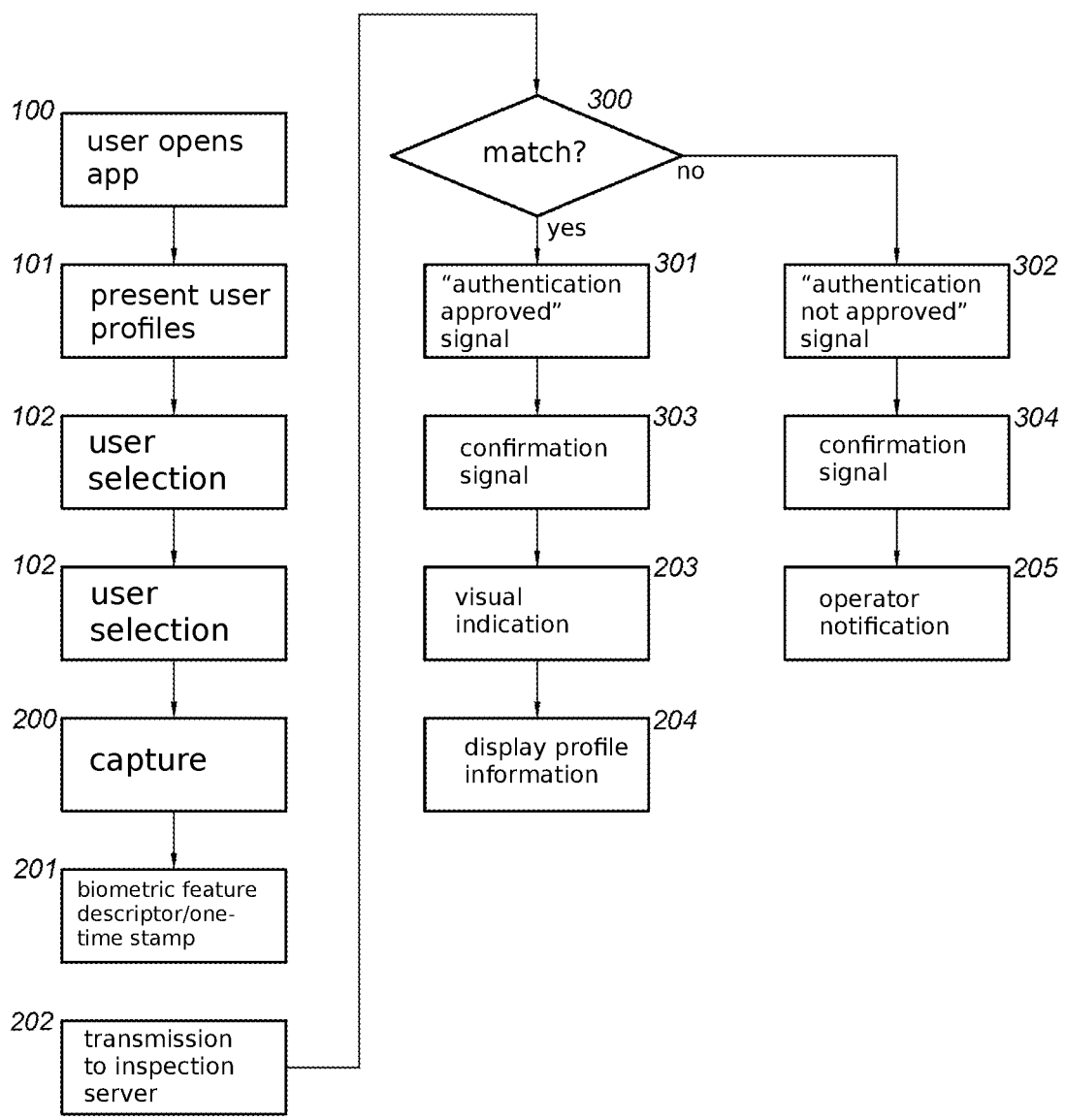

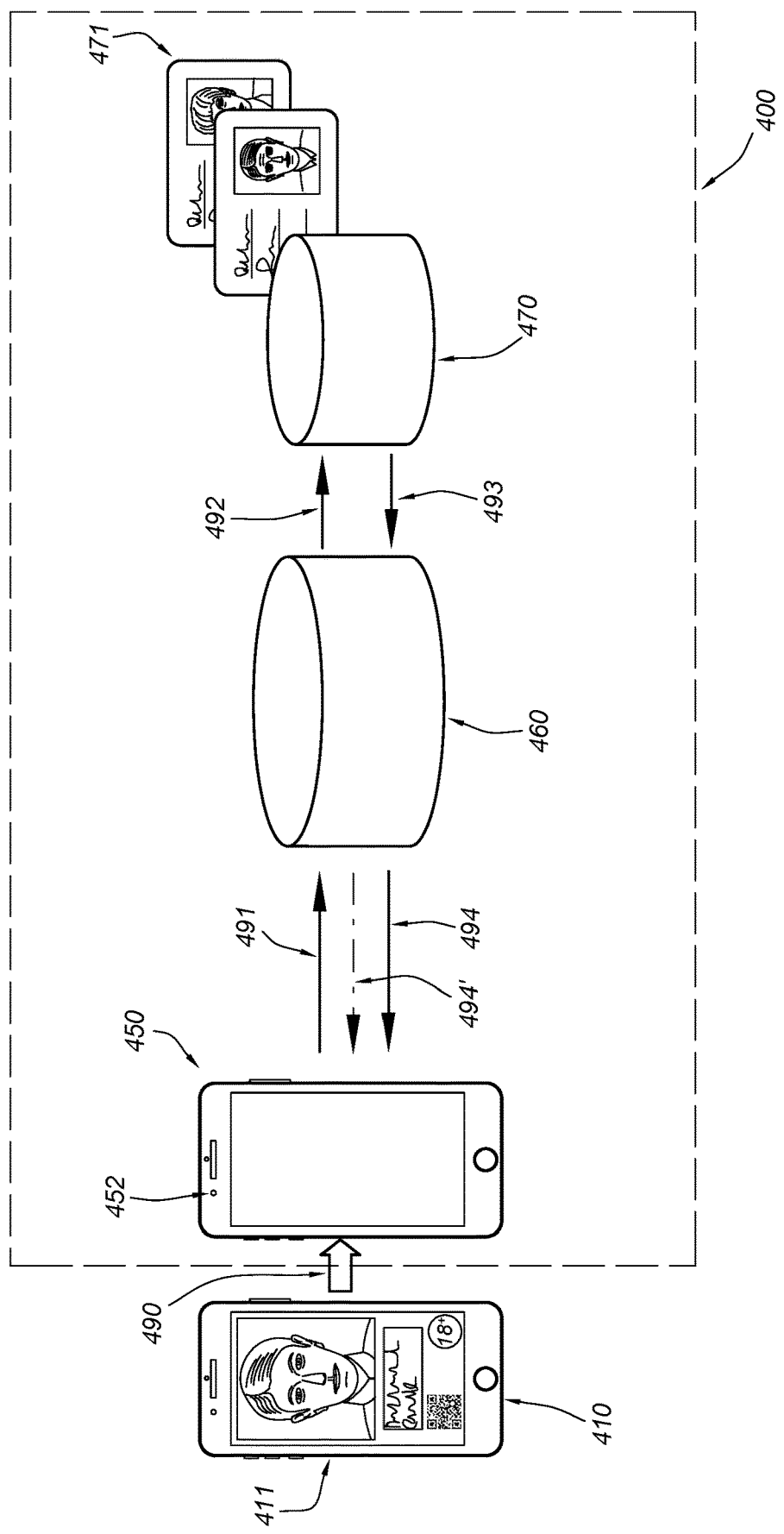

AUTHENTICATION OF A PERSON USING A VIRTUAL IDENTITY CARD

FIELD OF THE INVENTION

The present invention relates to a method and system for authenticating a user, using an inspection terminal that is provided with a digital camera, in which information including a human-recognizable visual representation of biometric data of the user is captured using the digital camera, a biometric feature descriptor is generated from the captured biometric data of the user, and the feature descriptor is transmitted to an inspection server adapted for validating whether the transmitted biometric feature descriptor corresponds to a centrally stored biometric feature descriptor of biometric data of the user. The invention further provides a method for registering, at such an inspection server, information that allows a user to be authenticated.

BACKGROUND ART

From DE 10 2014 100 463 A1 a method is known for identifying a user by means of a communication device, such as a smartphone, wherein an identification document is associated with the user. The known method comprises: capturing a biometric feature of the user by means of the communication device to obtain a captured biometric feature; transmitting, by the communication device, the captured biometric feature to an electronic identification service through a communications network; and comparing the captured biometric feature with a biometric reference feature by the electronic identification service, for identifying the user. In an embodiment the biometric feature is captured as an image sequence of the user using a digital camera of the communication device. Besides requiring significant processing power at the electronic identification service, this method is prone to errors as the user's appearance changes over time. In an alternative embodiment of the known method the biometric data is read directly from the identification document, e.g. using RFID or NFC technology, which would however require the user to keep the identification document on hand in order to be identified.

US 2016/0239653 A1 describes method of authenticating a digital credential of a bearer by a validating device. The method includes capturing the bearer credential, which may be in the form of QR code, by the validating device and transmitting to a validation service the bearer credential with a validator credential bound to the validating device. The method also includes at the validation service, validating the bearer credential and the validation credential, and if the validator credential is valid, using the bearer credential to access a data item of a digital profile and creating an electronic message for transmission to the validating device, the electronic message indicating the data item and comprising a fresh validator credential generated by the validation service. The electronic message may further contain a photo of the user. It is an object of the present invention to provide a method and system for authenticating a user of a mobile user terminal, without requiring the mobile user terminal to be able to receive data from an inspection terminal that is used during the authentication.

It is a further object of the invention to provide such a method which allows the user to select which information is shared in order to complete the authentication of the user. Also in view of the General Data Protection Regulation (EU) 2016/67 it is desirable that inspection terminals can only obtain access to personalization data for which the user has given permission.

Additionally, the invention aims to provide such a method which is protected against replay attacks.

SUMMARY OF THE INVENTION

To this end, according to a first aspect, the invention provides a method of authenticating a user of a mobile user terminal that is provided with a display, wherein the method comprises, using an inspection terminal provided with a digital camera, the steps of: i) capturing, with the digital camera, information presented on the display of the user terminal, the information comprising: a human-recognizable visual representation of biometric data of the user, a document identifier for identifying an identity document that has been issued to the user, a user profile specifying a subset of personalization data derived from the identity document, to be provided to the inspection terminal, and a one-time stamp; ii) calculating a biometric feature descriptor from the captured human-recognizable visual representation of the biometric data of the user, wherein the human-recognizable visual representation of biometric data of the user corresponds to an image of the user stored in the user's identity document; iii) transmitting the captured document identifier, biometric feature descriptor, user profile and the one-time stamp to an inspection server, wherein the inspection server comprises or is connected to an Identity Document Server (IDS) which stores, for each identity document of a plurality of identity documents issued to different persons, personalization data about the person to which the identity document has been issued and an associated document identifier uniquely identifying the respective identity document, wherein the inspection server is adapted for returning a signal "authentication approved" together with a subset of the personalization data defined by the user profile, if
  a) the transmitted biometric feature descriptor corresponds to a biometric feature descriptor of biometric data stored in the IDS for an identity document for which the associated document identifier corresponds to the transmitted document identifier, and
  b) the one-time stamp has not been received earlier for the transmitted document identifier;
iv) at the inspection terminal, waiting for the "authentication approved" signal, and upon receipt of said signal, generating an audible and/or visual signal indicating that authentication of the user for the specified authentication goal has been approved.

Examples of an identity document of which personalization data, e.g. full name, height, gender, signature, date and place of birth, and/or social security number, may be stored at the IDS, include a passport, a driver's license, and national identity card. Typically such identity documents are issued by a central authority such as a government or municipality, which keeps a centrally stored copy of the personalization data corresponding to each issued identity document. A typical example of a user terminal is a smartphone that is provided with a display on which the human-recognizable visual representation of biometric data of the user and the further information can be displayed. The further information, i.e. the document identifier, user profile and the one-time stamp, are preferably presented on the display in a machine-readable format, and may be hard to decipher by a human without using a computer. The biometric data of the user generally comprises, or consists of, an image of the user, usually an image of the user's face, e.g.

a photo-ID, or of one or more of his or her fingerprints, which can be visually checked by a person without requiring additional equipment such as a measuring tape, 3D scanning equipment. A person operating the user inspection terminal can thus easily compare live biometric features a person standing directly in front of him or her with the biometric data shown on the user terminal. The biometric data shown on the user terminal, together with the document identifier, user profile and the one-time stamp in this manner form a virtual identity card that can be shown by a user upon request. This virtual identity card is available to the user any place where the user carries the user terminal, and does not require the user to carry the actual identity document. Moreover, authentication of a user according to the method of the invention does not require central storage of the human-recognizable visual representation of data of the user. Though for each user a biometric feature descriptor is stored in the IDS, the feature descriptor is calculated in such a manner that it is not possible to calculate therefrom a human-recognizable visual representation of biometric data of the user that would allow the user to be identified. Thus, the image of the user, e.g. of his or her face, that is stored in the user's identity document does not need to be copied to or stored in the IDS or the inspection server, and preferably is not.

However, data which allows a human-recognizable visual representation of biometric data of the user to be displayed on the display of the mobile user terminal, is preferably stored in a memory of the mobile user terminal. Identity documents exist which store a digital representation of a user's face, in addition to human-recognizable visual representation thereof, allowing an exact copy of the digital representation to be read out and stored in a memory of the user terminal to be used for displaying the image on a display later on. If the user terminal is equipped with a wireless reader, e.g. a NFC or RFID reader, the exact digital representation can be directly read out from the document by the user terminal. Alternatively, the read-out may be carried out using a separate reading device, e.g. comprising an NFC and/or RFID reader, and subsequently transferred to the user terminal, e.g. via the Internet, a Bluetooth connection or the like. In either case, the biometric feature description is calculated in step ii) based on a captured human-recognizable visual representation of biometric data of the user which corresponds to an image of the user, such as a photograph of the user's face, that is stored in the user's identity document.

The inclusion of a one-time stamp in the virtual identity card substantially protects against replay attacks.

As the information that is presented on the display of the mobile user terminal to the inspection terminal is captured by a camera of the inspection terminal, there is no need for a connection, such as an Internet connector or Bluetooth connection, for transfer of data from the inspection terminal to the user terminal to carry out the method. In principle, steps i)-iv) of the method may even be carried out without there being any communication from the inspection server to the user's mobile terminal.

Depending on an intended authorization purpose, the user may be able to choose between different user profiles to be presented on the display, each specifying a different subset of personalization data that is to be provided to the inspection terminal. For instance, if the user wants to use the virtual identity card to identify himself to a police officer, the personalization data that is shared may be personalization data corresponding to data from the user's corresponding identity document, such as date and place of birth, gender, length and/or social security number. In other circumstances, the user may not wish to share this much information. E.g. in many hotels, some sort of identification is required before the key to a hotel room is handed over. In this case the user may wish to only share his name and whether or not he is 18 or above as personalization data to allow the hotel to authenticate the user, while not sharing his or her exact date of birth and social security number. When a user profile is selected for allowing stores to authenticate whether a person is legally allowed to buy alcohol, the information that is provided to the inspection terminal may consist only of whether the person is above the legal age for buying alcohol. In this manner, the amount of personalization information a user has to share with third parties is minimized to only that information which is required for the intended authentication purpose and the risk of identity theft is reduced. Besides the indication of the subset of personalization data that the user is willing to allow to be transmitted from the inspection server to the inspection terminal, the user profile may also comprise information on the intended authorization purpose.

The document identifier, which uniquely identifies an identification document that has been issued to the user, is preferably stored in a memory of the user terminal. This identifier preferably cannot be derived solely from data in the identification document, and more preferably the document identifier does not contain any personalization information that is stored in the identification document.

Step ii) is carried out at the inspection terminal, so that the actual human recognizable visual representation of biometric data of the user does not have to be transmitted from the inspection terminal to the inspection server. Calculation of a biometric feature descriptor from a visual representation of biometric data of is known in the art. The calculation typically comprises determining salient points in the captured biometric data and calculating a vector of feature values based on properties of these points. Alternatively, calculation of the biometric feature descriptor may comprise calculating one or more histograms of pixel values of the captured human-recognizable visual representation of the biometric data of the user.

The biometric feature descriptor can be used to determine a level of similarity of the image with another image but does not contain sufficient information to reconstruct the image, and may thus be viewed to form a kind of hash of the biometric data. For instance the inspection terminal may calculate a first biometric feature descriptor based on the captured human-recognizable visual representation of the biometric data of the user. At the Identification Document Server, a second biometric feature descriptor is stored which has been calculated earlier based on a digital copy of the photo in the passport that has been read out using RFID and/or NFC technology. As the captured human-recognizable visual representation and the digital copy of the photo will differ, the first and second feature vector will not be identical. However, a measure of similarity between the human recognizable visual representation and the digital copy of the photo can be determined based on a similarity between the first and second biometric feature descriptor, e.g. by calculating a distance measure between the first and second feature descriptors. A suitable distance measure that can be used is the Hamming distance. In an embodiment, step iv) comprises, upon receipt of the "authentication approved" signal, displaying on a display of the inspection terminal, all or part of the subset of the user's personalization data which corresponds to the user profile. The data is preferably displayed in a human-readable format. Transmission of the user's personalization data from the inspection server to the inspection terminal is preferably encrypted, e.g. using AES encryption, to prevent other parties from accessing the user's personalization data as well as preventing them from sending a spoofed "authentication approved" signal to the inspection terminal.

In an embodiment the information on the user profile that is displayed on the user terminal is selected from a predetermined set of user profiles that is supported by the IDS. Thus, the personalization information which the user can share with the inspection terminal is limited to the personalization information corresponding to a user profile in the predetermined set. In this manner a user is substantially prevented from inadvertently sharing more information than required to allow the inspection terminal to authenticate the user. Additionally, the entity operating the IDS, which will typically be a governmental agency or an entity that is trusted by a national government, can decide which user profiles are to be part of the predetermined set of user profiles, based upon which user's personalization data can be shared with third parties.

In an embodiment, the "authentication approved" signal preferably also comprises a checksum that is based on the information that was transmitted to the inspection server. This allows the inspection terminal to only generate the audible and/or visual signal indicating that authentication of the user has been approved when the inspection terminal has verified that the checksum of the "authentication approved" signal corresponds to the information the inspection terminal sent to the inspection server. Such verification may for instance be performed by calculating, both at the inspection terminal and the inspection server, a checksum of the information that is sent to the inspection server.

In an embodiment the document identifier, the user profile and/or the one-time stamp are presented on the display of the user terminal in a barcode and/or a QR-code format, e.g. the PDF417 format, wherein this information is preferably combined in a single barcode and/or QR-code. A variety of software and tools already exists for reliably decoding the information stored in such formats.

In an embodiment, the one-time stamp includes a time code indicating the time and date the one-time stamp was generated at the user terminal, wherein the inspection server only returns the "authentication approved" signal if the time code indicates that the one-time stamp was generated within a predetermined time period from receipt thereof at the inspection server. The one-time code in this manner is provided with an expiry time after which it can no longer be user to authenticate a user. The expiry time may for instance be less than 1 minute, or 30 seconds.

In an embodiment step iii) further comprises sending a unique identifier of the inspection terminal to the inspection server, wherein the inspection server comprises a list of unique identifiers of inspection terminals and associated kinds of personalization data each inspection terminal is allowed to receive, wherein the inspection server is adapted for only returning the signal "authentication approved" together with the subset of the personalization data defined by the user profile, if the inspection terminal with the unique said identifier is allowed to receive the personalization data indicated in the user profile. In this manner, an inspection terminal can gain access to a user's personalization data only if it has been registered at the inspection server, and even then cannot access personalization it is not allowed to access.

In an embodiment the personalization data comprises or consists of the information on the person that is included in the identity document issued to the person, wherein the document identifier is not included in the identity document. The document identifier thus cannot be derived based solely on information from the identity document. In this manner it is ensured that none of the information that is transmitted to the inspection serves comprises a direct copy of information that is included in the user's identity document. Even if this transmitted information is obtained by an untrusted party, this does not enable the third party to reconstruct or steal the user's identity.

In an embodiment the method further comprises sending to the user terminal a signal indicative that the inspection server has received a document identifier which corresponds to the document identifier presented on the display of the user terminal. This allows the user terminal to provide feed-back to the user on whether the inspection terminal indeed has transmitted information to an identity server. Preferably this signal is sent to the user terminal independent from the inspection terminal, e.g. the signal may be sent from the inspection server without passing through the inspection terminal. More preferably the signal is sent from the inspection server to the user terminal via a different means of communication than used for communicating between the inspection terminal and the inspection server. For instance, if the inspection terminal communicates with the inspection server via the Internet, then preferably the signal is sent from the inspection server to the user terminal via another communication channel, such as SMS or Bluetooth. The signal sent to the user may include information on the user profile that was captured by the inspection terminal. This allows the user to check whether the inspection terminal has received the data specified in the intended user profile, or has received information specified in some other user profile.

In an embodiment, the human-recognizable visual representation of biometric data of the user corresponds to image of the user that is visually printed on the user's identity document. For instance, the representation may be formed by a photo of the user in his or her passport.

In an embodiment the method comprises, prior to step i), issuing an identity document to the user and assigning a unique document identifier to the identity document, wherein the document identifier is not included in the identity document, and storing, at the Identity Document Server, personalization data corresponding to personalization data included in the identity document and the associated document identifier. The authority issuing the identity document can thus ensure that the personalization data and document identifier at the IDS correspond to the personalization data that is included in the identity document and the document identifier that is stored in the memory of the user terminal. The unique document identifier is preferably generated independent of the data content of the user's identity document, so that the identifier by itself cannot be used to derive information that is also stored in the identity document.

The invention also provides a computer program product comprising instructions which, when executed by a processor of an inspection terminal, cause the processor to carry out the method of as described above.

In an embodiment, the method further comprises, returning, by an inspection server which comprises or is connected to an Identity Document Server (IDS) which stores, for each identity document of a plurality of identity documents issued to different persons, personalization data about the person to which the identity document has been issued and an associated document identifier uniquely identifying the respective identity document, a signal "authentication approved" together with a subset of the personalization data defined by the user profile, if the transmitted biometric feature descriptor corresponds to a biometric feature descriptor of biometric data stored in the IDS for an identity document for which the associated document identifier corresponds to the transmitted document identifier, and the one-time stamp has not been received earlier for the transmitted document identifier.

These steps are carried out upon receipt in step iii) of the captured document identifier, biometric feature descriptor, user profile and the one-time stamp at the inspection server.

According to a second aspect, the present invention provides a method for presenting user authentication data on a user terminal that is provided with a display, an input device, and a memory, the memory storing: biometric data of the user, a document identifier for identifying an identity document that has been issued to the user, one or more user profiles, each user profile specifying a subset of personalization data derived from the identity document issued to the user, to be provided to the inspection terminal, wherein the method comprises the steps of: presenting, on the display, multiple of the one or more user profiles; receiving, via the input device, input from the user on which user profile of the one or more user profiles is to be used; and presenting, on the display: a human-recognizable visual representation of the biometric data of the user stored in the memory, a machine-readable representation of the document identifier, a machine-readable representation of the user profile to be used, and a one-time stamp. This method may be carried out at the user terminal, and used in combination with the method according to the first aspect of the invention. The one-time stamp is preferably either generated by the user terminal, or stored in the memory of the user terminal.

In an embodiment the subset(s) of personalization data specified by the user profiles is not present in the memory of the user terminal that is accessed for carrying out the method. Thus, even if the user terminal is seized by an unauthorized party, no personalization data of the user that is derived from personalization data that is included in the user's identity document can be found in the memory of the user terminal that is used for carrying out the method. In particular, neither a social security number, "citizen service number", nor any other alphanumerical code that is copied from the identity document and uniquely identifies a user is present in the memory.

The invention also provides a computer program product comprising instructions which, when executed by a processor of a mobile user terminal, cause the processor to carry out a method according to the second aspect of the invention.

According to a third aspect, the invention provides as system comprising: an inspection server comprising or connected to an Identity Document Server (IDS) which stores, for each identity document of a plurality of identity documents issued to different persons, personalization data about the person to which the identity document has been issued and an associated document identifier uniquely identifying the respective identity document; an inspection terminal provided with a digital camera and a display, wherein the inspection terminal is adapted for: i) capturing, with the digital camera, an image containing: —a human-recognizable visual representation of biometric data of the user, —a document identifier for identifying an identity document that has been issued to the user, —a user profile specifying a subset of personalization data derived from the identity document issued to the user, to be provided to the inspection terminal, and—a one-time stamp; wherein the inspection terminal is further adapted for ii) calculating a biometric feature descriptor from the captured human-recognizable visual representation of the biometric data of the user; and iii) transmitting the captured document identifier, biometric feature descriptor, user profile and the one-time stamp to an inspection server; wherein the inspection server is adapted for returning a signal "authentication approved" together with a subset of the personalization data defined by the user profile, if the transmitted biometric feature descriptor corresponds to a biometric feature descriptor of biometric data stored in the IDS for an identity document for which the associated document identifier corresponds to the transmitted document identifier, and the one-time stamp has not been received earlier for the transmitted document identifier;

and wherein the inspection terminal is adapted for waiting for the "authentication approved" signal, and upon receipt of said signal, generating an audible and/or visual signal indicating that authentication of the user for the specified authentication goal has been approved.

In an embodiment the inspection server does not store a copy of the human recognizable visual representation of biometric data of the user. The system can thus be used to authenticate a user of a mobile user terminal as described above, without an image of the user being stored in or transmitted to the inspection server or IDS. Preferably, the inspection server does not store any information from which a human recognizable visual representation of biometric data of the user can be reconstructed.

In an embodiment the biometric feature descriptor is calculated from the captured human-recognizable visual representation in such a manner that a human-recognizable visual representation of the user cannot be reconstructed from the biometric feature descriptor, for instance using a one-way function. The size in bits of the biometric feature descriptor is smaller than the size in bits of the captured human-recognizable visual representation of the user. For instance, the biometric feature descriptor will typically have a size of 1000 bits or less, whereas the captured human-recognizable visual representation of the user will typically have a size of at least 200 kilobyte.

According to a fourth aspect the invention provides a method for registering, at the inspection server of the system according to the third aspect of the invention, a biometric feature descriptor of human recognizable visual representation of biometric data of a user to whom a tangible identity document has been issued, as well as a document identifier for uniquely identifying the tangible identity document and personalization information that is stored in the tangible identity document, the method comprising the steps of:

reading out a document identification string from the tangible identity document;

electronically reading out personalization information and a human recognizable visual representation of biometric data of the user that is stored in the tangible identity document;

sending the document identification string to a verification server and receiving a response indicating whether the identity document associated with the document identification string is valid or not;

capturing a live image of the user;

calculating a difference measure indicative of a difference between the human recognizable visual representation of the biometric data of the user and the captured live image of the user; and if the difference measure is below a predetermined threshold and the identity document associated with the document identification string is valid, carrying out the further steps of:

generating a document identifier for uniquely identifying the identity document, wherein the document identifier cannot be derived solely from data in the identification document;

calculating a biometric feature descriptor from the electronically read out human-recognizable visual representation of the biometric data of the user;

transmitting the biometric feature descriptor and the personalization information to the inspection server and storing these together with the document identifier at the inspection server; and transmitting (524) the document identifier to a mobile user terminal, such as a user's mobile phone.

Using this method, relevant data which allows authentication of user is stored at the inspection server. Based on this data the system can be used for authenticating a user who shows on a display of a user terminal the information comprising a human-recognizable visual representation of biometric data of the user, a document identifier, a user profile and a one-time stamp. When the user is be present near the inspection terminal during authentication, the person operating the inspection terminal can also visually check whether the person shown on the display of the user terminal is indeed the user.

Though a biometric feature descriptor is stored at the inspection server, no photo-ID or finger print of the user needs to be stored at the inspection server once registration has been completed, and preferably, once the registration has been completed, the inspection server does not contain any data that allows the photo-ID or finger print to be reconstructed. The unique document identifier is typically generated independent from the document identification string, e.g. using a pseudo random number generator. The difference measure is typically calculated based on differences between features in the live captured image of the user and the human recognizable visual representation of the biometric data of the user. Features based upon which the distance measure is calculated may include a distance between eyes, width of the mouth, distance of each eye to the nose, and the like. The verification server is preferably adapted for indicating identity document associated with the document identification string is not valid when the expiration date of the identity document has expired or when the identity document has been revoked, e.g. in case it was reported as stolen. Such a verification server will generally be operated by a government agency.

In an embodiment the steps of: reading out a document identification string from the identity document; electronically reading out personalization information and a human recognizable visual representation of biometric data of the user that is stored in the identity document; and capturing a live image of the user; are carried out using the mobile user terminal, such as a mobile phone. This allows the user to register him- or herself using the mobile user terminal, without requiring a human, e.g. a government official or the like, to confirm that the user indeed corresponds to the read out human recognizable visual representation. In this embodiment, a copy of the document identifier and of the electronically read out a human recognizable visual representation of biometric data of the user are stored in the mobile user terminal.

In an alternative embodiment, the steps of: reading out a document identification string from the identity document; electronically reading out personalization information and a human recognizable visual representation of biometric data of the user that is stored in the identity document; and capturing a live image of the user; are carried at a registration system that is different from the mobile user terminal. The registration system is preferably a system certified and/or owned by a government agency that is tasked with issuing tangible identification documents to users. In order to register him or herself, the user will have to physically go to the registration system, usually at a town hall, in order to register. This manner of registering provides a higher level of trust authentication than when the above steps are carried out by a user using his or her mobile user terminal. In this embodiment, a copy of the document identifier and of the electronically read out a human recognizable visual representation of biometric data of the user are transmitted to and stored in the mobile user terminal.

In an embodiment the method further comprises the step of transmitting, to the mobile user terminal, an acknowledgement that the registration is complete.

In an embodiment the method further comprises the step of receiving transmitting, from the mobile user terminal, an acknowledgement that the mobile user terminal has received the document identifier. The acknowledgment is preferably received at the registration system and/or at the inspection server, and may be sent for instance via the Internet, SMS, a Bluetooth connector or the like, In an embodiment the method further comprises, after the step of capturing the live image of the user and prior to carrying out the further steps: generating a one-time registration code at the registration system or the inspection server and transmitting the one time registration code to the mobile user terminal; receiving, from the mobile user terminal, a message indicating whether the user has received the one time code and wishes to register his personalization data at the inspection server; receiving, from the mobile user terminal, a further live image of the user captured by the camera of the mobile user terminal; calculating a further difference measure indicative of a difference between the human recognizable visual representation of the biometric data of the user and the captured further live image of the user; wherein the further steps of the method are carried out only if the further difference measure is below a further predetermined threshold and the message is received from the mobile user terminal within a predetermined time after generating the one-time registration code and indicated that the user received the one time code and wishes to register his personalization data at the inspection server.

In an embodiment the method comprises, after registration is complete, carrying out the steps of the method of the first aspect of the invention.

SHORT DESCRIPTION OF DRAWINGS

Figure 1B:
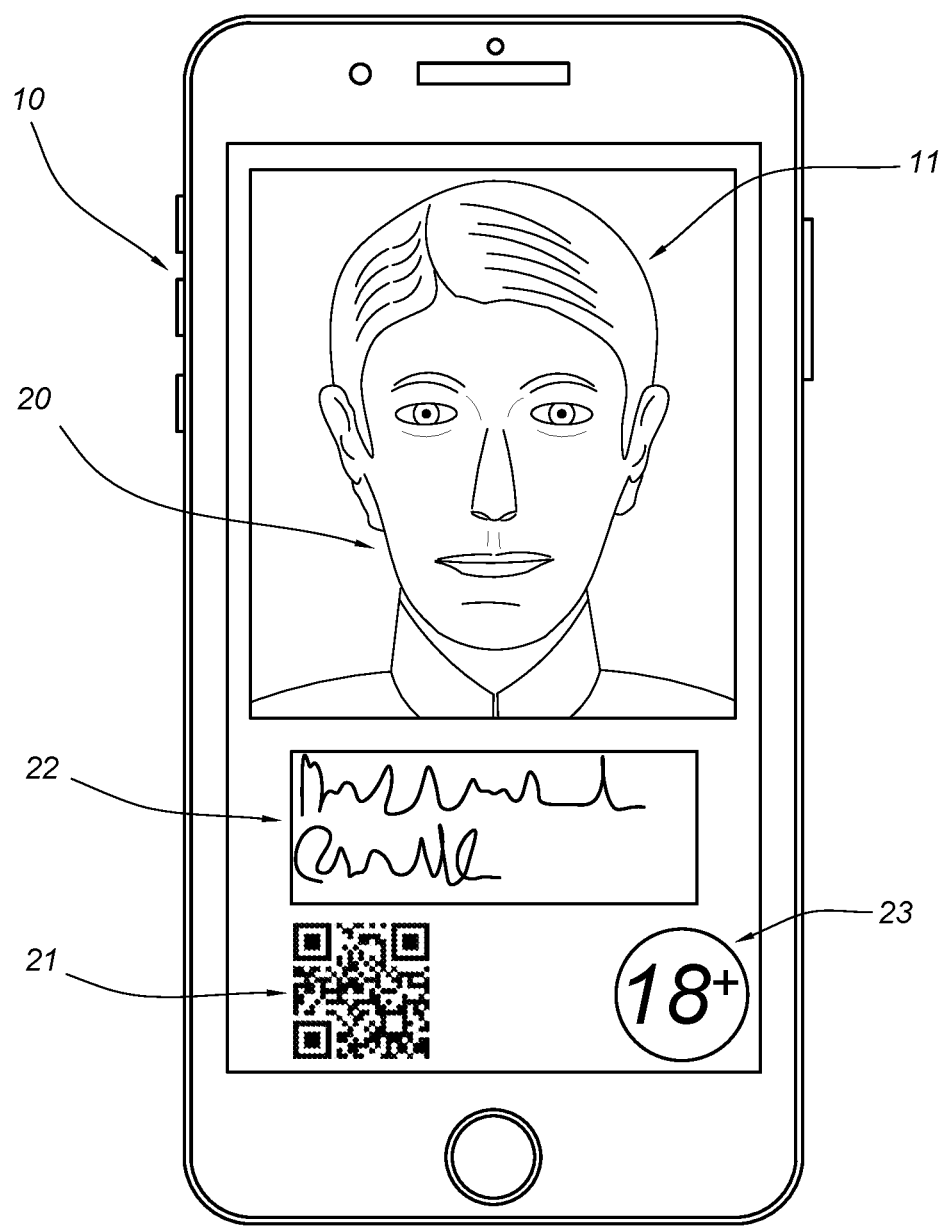
Figure 1C:
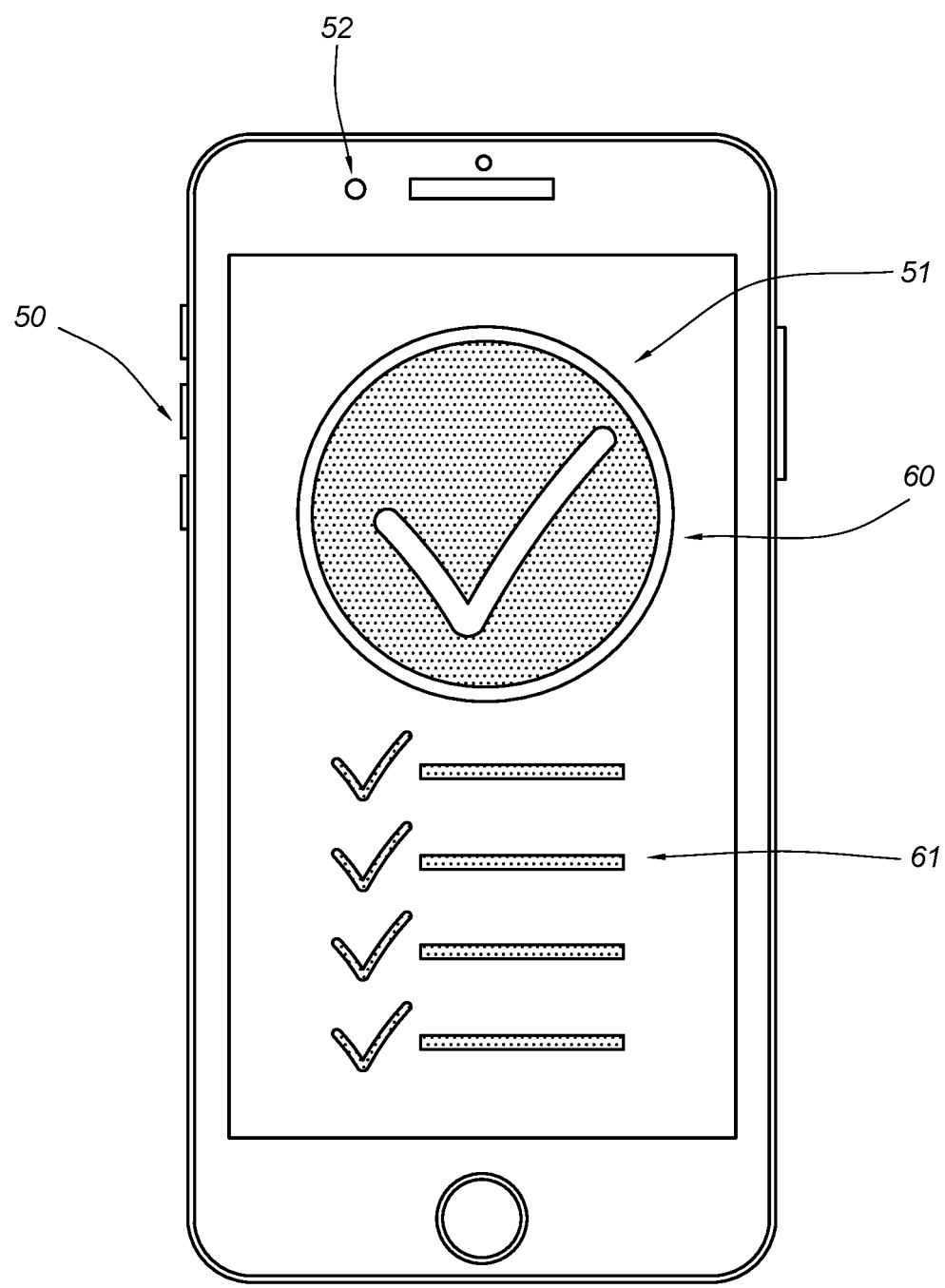
Figure 1D:
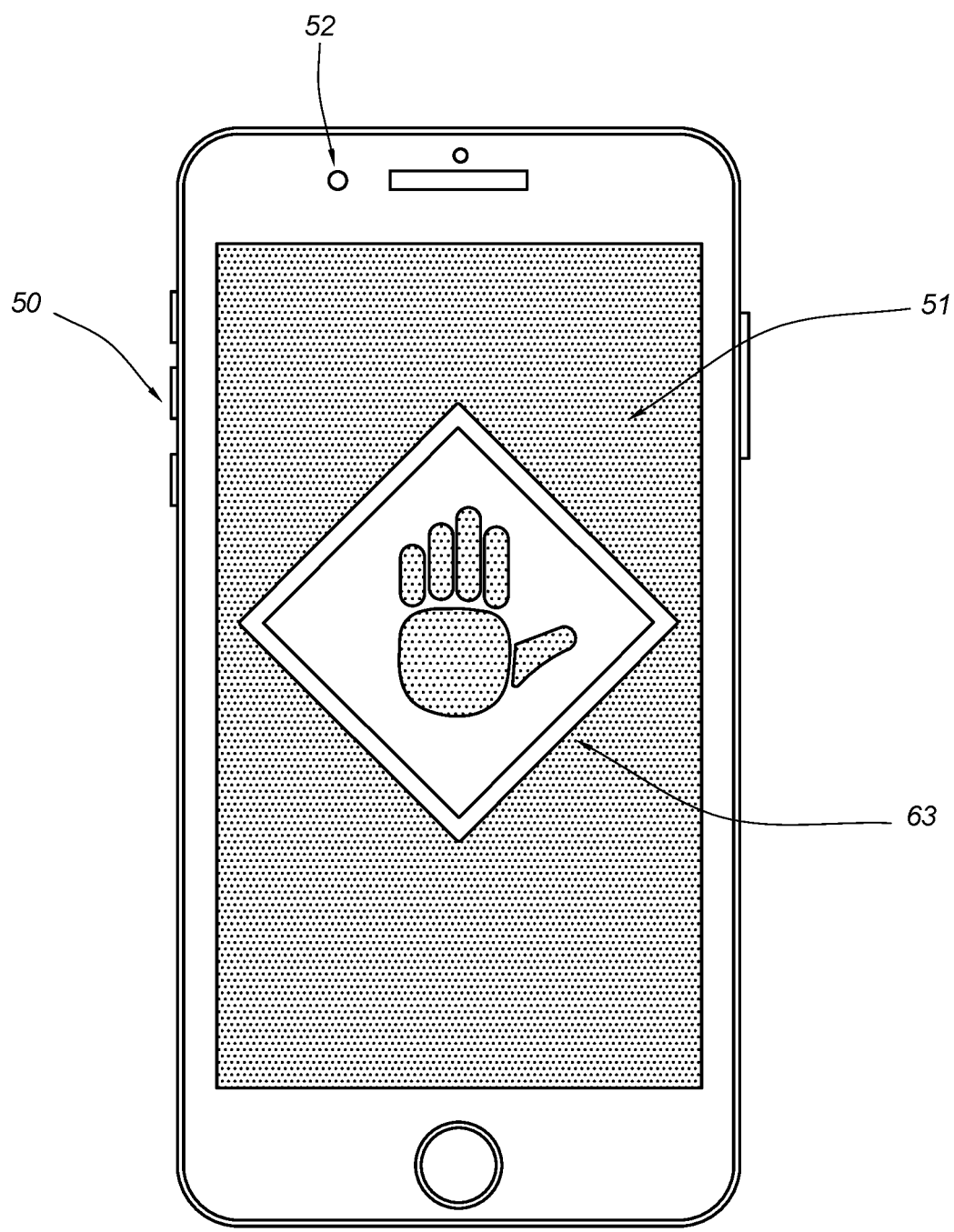
Figure 1E:
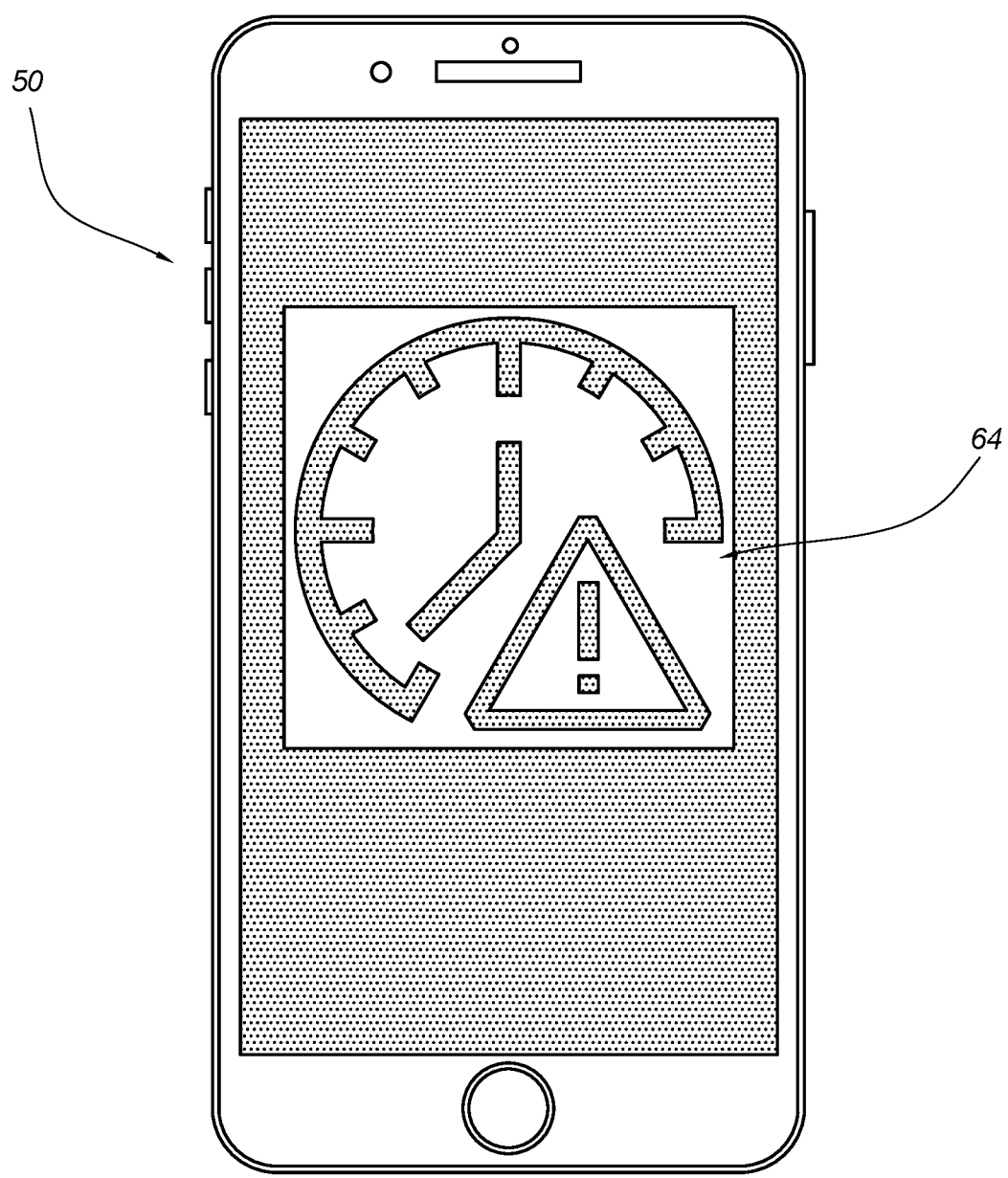
Figure 5:
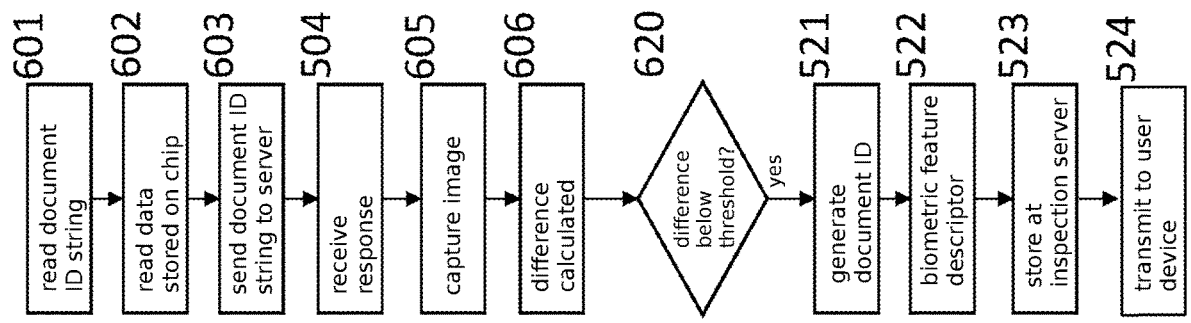
Figure 4:
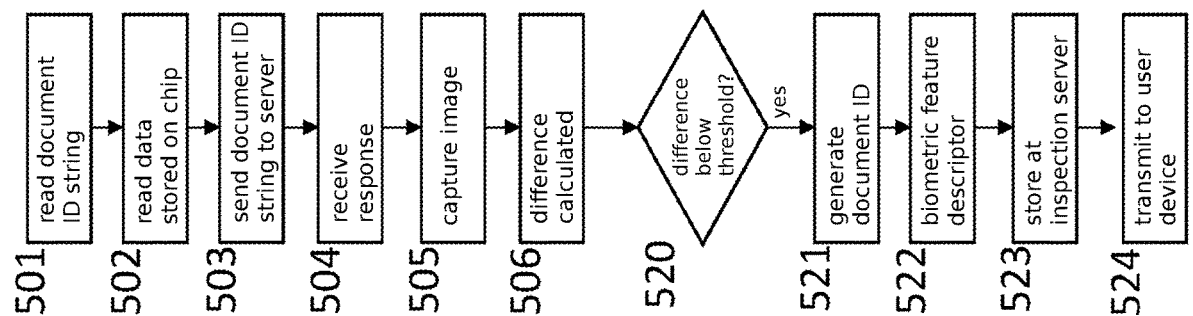

The present invention will be discussed in more detail below, with reference to the attached drawings, in which FIGS. 1A and 1B schematically a user terminal as may be used in the method of the invention, respectively presenting the user with a selection of user profiles, and presenting an inspection terminal with a virtual identity card, FIGS. 1C-1E schematically show an inspection terminal as may be used according to the invention, respectively indicating that the authentication of a user has been approved, has been disapproved, and that a time-out error has occurred, FIG. 2 schematically shows a flow chart of method steps for authenticating a user in accordance with the present invention, FIG. 3 schematically shows a system according to the invention, comprising an inspection terminal and an inspection server, FIG. 4 shows a flow chart of a method for registering using a user's mobile phone;

FIG. 5 shows a flow chart of a method for registering at a registration system that is different from the user's mobile phone.

DESCRIPTION OF EMBODIMENTS

FIGS. 1A and 1B respectively show a mobile user terminal 10 as may be used according to the invention, the display in FIG. 1A presenting the user with a selection of user profiles 13,14,15,16 for selection by the user, and the display in FIG. 1B displaying information to be captured by an inspection device as may be used according to the invention. FIG. 1A shows the user terminal 10, which in the embodiment shown is a smartphone. The user terminal is portable, e.g. weighs less than 350 gr, and may be carried by the user in a pocket of his/her clothing or in a purse. Smartphones are already in general use, so that the inconvenience of carrying around an additional user terminal besides the smartphone may be avoided. The user terminal 10 comprises a touch display 11 for presenting information to a user and for receiving user input, as well as a memory 12, here shown only schematically, in which a computer program is stored that allows the user, depending on an authentication purpose intended by the user, to select between different user profiles. The display shows a number of different user profiles 13, 14, 15, 16, each of which specifies which of personalization data that is derived from the user's physical identity document the user is willing to share to allow another party to authenticate the user. The user profiles e.g. in accordance with the table below:

| User profile shown in FIG. 1A | Intended authentication purpose | Personalization data derived from user's identity document that is to be shared with the other party: |
|---|---|---|
| 13 | Buying controlled substances, such as alcohol or tobacco | photo ID and whether or not the user is of drinking age/age for buying tobacco (e.g. at least 18 or 21 years old) |
| 14 | Border clearance | photo ID, full name, age and unique alphanumerical identifier for the user copied from the user's identity document |
| 15 | Registering at a hotel | photo ID, full name and age |
| 16 | Identifying the user to the police | photo ID, full name, age and unique alphanumerical identifier for the user copied from the user's identity document |

Another user profile that may be selectable has as an intended authentication purpose gaining access, e.g. to a concert or festival, and the personalization data associated with the user profile is a photo ID and a ticket number.

Once the user has selected which user profile is to be used, the user terminal's display 11 changes to present a virtual identity card as shown in FIG. 1B to an inspection terminal. Regardless of which user profile has been selected, the virtual identity card that is displayed on the user terminal comprises a photo ID 20, i.e. an image of the user, as well as information 21 on the selected user profile, a unique document ID that is associated with a physical identity document that has been issued to the user, and a one-time stamp. The information 21 is shown in a barcode format that can easily be read by a machine and that is hard to decode by a human without a machine.

Though not essential, in order to provide additional security the information 21 is preferably periodically refreshed, wherein each time a different one-time stamp is included in the information 21. For instance, the information 21 may be refreshed every 5, 10 or 30 seconds. Security is improved even further if the information 21 comprises a time code indicating the time and date the information 21, was generated. This time code can be decoded at the inspection server, allowing it to prevent a "authentication approved" signal being sent if the time code indicates that the one-time code was generated more than a predetermined amount of time before being received at the inspection server, e.g. more than 10 seconds.

The photo ID 20 is retrieved from the memory 12, here shown schematically, and is preferably an exact digital copy of a photo ID that has been read out electronically from a physical identification document at a time prior to presenting it on the display 11. Modern identity cards such as passports, national ID cards and driver's licenses, may contain information, including a photo ID, that can be read out using NFC or RFID technology. Such modern identity cards are generally equipped with a Basic Access Control (BAC) mechanism, to ensure only authorized parties can wirelessly read the information stored in the chips on the cards. In order to read electronically stored data from such documents, it is assumed access to the physical identification document is required. Once a digital copy of the photo ID has been stored in the memory of the user terminal, no further physical access to the identity document is needed in order to authenticate the user.

The user terminal 10, which is not necessarily equipped with a functioning camera, can thus access a representation of the photo ID that is stored in its memory 11, even when the physical identification document is stored remotely. In the figure, the photo ID and the information 21 in barcode format together form the virtual identity card. Besides the virtual identity card, the user's name 22 as well as an indication 23 of the user's age are also shown on the display in a human readable format, though displaying and sharing this information is optional. Displaying the user's name and age indication can be omitted to minimize the amount of human-readable personalization information that can be read of the display by a person viewing it, without affecting further steps of the authentication.

Once the virtual identity card is presented on the display of the user terminal, it can be captured by an inspection terminal. Such an inspection terminal 50 is shown in FIG. 1C and comprises a digital camera 52 for capturing the information presented on the display of the user terminal, which information includes human-recognizable photo ID of the user, as well as the user profile selected by the user and a one-time stamp. The inspection terminal 50 is adapted for calculating a biometric feature descriptor from the captured human-recognizable visual representation of the biometric data of the user. After calculating this feature descriptor, the inspection terminal transmits the captured document identifier, biometric feature descriptor, user profile and the one-time stamp to an inspection server, and waits for the inspection server to return an "authentication approved" signal, together with the personalization data specified in the selected user profile. If the inspection terminal receives such a signal and personalization data within a predetermined time period, e.g. within 30 seconds, of transmitting to the data to the inspection server, it shows information 60 on its display 51 that is indicative that the authentication has succeeded, as well as the personalization data 61, as shown in FIG. 1C.

If instead of the "authentication approved" signal, the inspection terminal receives an "authentication not approved", this is shown on the display 51, as illustrated in FIG. 1D. In FIG. 1D the display 51 shows information 63, here in the form of an icon, indicating that authentication has not been approved. As, when the authentication is not approved, no personalization data of the user is sent from the inspection server to the inspection terminal, the display 51 does not show such personalization data of the user.

If the "authentication approved" signal is not received at the inspection terminal within a predetermined time period from the point in time the one time stamp was generated, then this is shown as information 64, again in the form of an icon, on the display 51 of the inspection terminal 50, as shown in FIG. 1E. The one-time stamp captured by the inspection terminal may include a time code indicating the time and date the one-time stamp was generated at the user terminal, allowing the inspection terminal to check whether a predetermined period of time has passed since the time and date the one time stamp was generated. The icon 64 is then displayed if no "authentication approved" has been received within the predetermined time period after generation of the one time stamp. Alternatively, this icon may be shown simply if more than a predetermined amount of time has passed between transmitting the information from the inspection terminal to the inspection server and receiving an "authentication approved" signal from the inspection server. The predetermined amount of time is preferably less than 30 seconds, more preferably less than 10 second.

FIG. 2 schematically shows a flow chart of steps of authenticating a user. In the flow chart, method steps that carried out at the inspection terminal are indicated using reference numerals 100-102, method steps that are carried out at the user terminal are indicated using reference numerals 200-205, and method steps that are carried out at an inspection server are indicated using reference numerals 300-304.

Authentication starts at step 100, in which a user opens a virtual identity car app on his smartphone. The app may be protected by a PIN or a fingerprint scan ("touch scan") or the like to prevent the app being opened by unauthorized persons. Once the correct PIN or the like has been entered, a number of user profiles is presented on the smartphone's display in step 101. In step 102 a user selection of one these user profiles is received, and subsequently, in step 103, a corresponding virtual identity card, comprising the users photo ID, the document identifier, the selected user profile and a one-time stamp, is shown on the display. Next, in step 200 the displayed photo ID, document identifier, selected user profile and the one-time stamp are captured by the inspection terminal using a digital camera. Based on the captured photo ID, in step 201, a biometric feature descriptor is calculated. Such a descriptor may for instance comprise information on salient features of a person's face, such as distance between the eyes, width of the mouth, distance to the nose, histograms of pixel values of the captured image, and so on. Additionally, in step 201 a one-time stamp is generated. This one-time stamp may comprise information on the time and date the one-time stamp was generated, as well as a checksum of the user profile. In step 202 the calculated biometric feature descriptor, together with the captured document identifier, user profile and one-time stamp, is transmitted to an inspection server.

The inspection server comprises or is connected to an Identity Document Server (IDS) which stores, for each identity document of a plurality of identity documents issued to different persons, personalization data about the person to which the identity document has been issued and an associated document identifier uniquely identifying the respective identity document. The inspection server and IDS will generally be located in a highly secure location, and communication channels between the inspecting terminal and the inspection server will be secured as well, e.g. using AES encryption, to prevent third parties from intercepting communication between the two.

In step 300, the inspection sever checks whether the transmitted biometric feature descriptor corresponds to a biometric feature descriptor of biometric data stored in the IDS for an identity document for which the associated document identifier corresponds to the transmitted document identifier, and also checks that the one-time stamp has not been received earlier for the transmitted document identifier. If both are the case the inspection server proceeds to step 301 and returns a signal "authentication approved" together with a subset of the personalization data defined by the user profile, to the inspection terminal. Otherwise the inspection server proceeds instead to step 302 and returns a signal "authentication not approved" to the inspection terminal. In any case, the one-time stamp is stored at the inspection server and associated with the transmitted document identifier.

In steps 303 and 304, which are optional, the inspection server sends the user terminal a signal indicative that the inspection server has received a document identifier which corresponds to the document identifier presented on the display of the user terminal.

In step 203, the inspection terminal, upon receipt of the "authentication approved" signal, generates a visual indication on its display to notify the operator of the inspection terminal that the user has been successfully authenticated. Optionally, the information specified in the selected user profile is displayed as well, in step 204. In case no "authentication approved" signal is received by the inspection terminal within a predetermined time, of in case an "authentication not approved" signal is received instead, the inspection terminal notifies the operator of the inspection terminal in step 205 that authentication of the user has not been approved.

FIG. 3 schematically shows a system 400 according to the invention. The system comprises an inspection terminal 450, e.g. corresponding to the inspection terminal 50 of FIG. 1B, an inspection server 480 at a location remote from the terminal 450, as well as an Identity Document Server, IDS. Further shown is a user terminal 410, with a display 411 on which in a single image an ID-photo of the user is shown, together with a document identifier, user profile and one-time stamp as described earlier herein. The information in this image is captured by digital camera 452 of the inspection terminal 450, and the terminal calculates a biometric feature descriptor from the captured photo-ID of the user. The exchange of information between the user terminal 410 and inspection terminal 450 is one-way only, from the user terminal to the inspection terminal as indicated by arrow 490. The terminal subsequently for transmits the captured document identifier, biometric feature descriptor, user profile and one-time stamp to the inspection server 460, as indicated by arrow 491.

Upon receipt of this information, the inspection server 460 contacts an Identity Document Server, IDS, 470 which stores, for each identity document of a plurality of identity documents issued to different persons, personalization data about the person to whom the identity document has been issued and a document identifier which uniquely identifies the identity document but cannot be derived merely from the identity document by itself. The IDS 470 further stores, for each identity document, a copy of the photo-ID that is present in the identity document. Though in FIG. 3 the IDS is shown to be part of the system 400, it will be appreciated that instead an IDS separate from the system may be used, as long as the inspection server 460 is able to communicate with the IDS.

Line 492 indicates that the user profile and document identifier are transmitted from the inspection server to the IDS 470. Based on this, the IDS returns a biometric feature descriptor of the photo ID of the document corresponding to the document identifier to the inspection server, as indicated by line 493.

Either at the inspection server 460 or at the IDS 470 it is subsequently checked whether the biometric feature descriptor of the photo ID that was captured by the inspection terminal corresponds to the biometric feature descriptor of the photo-ID for the document identified by the document identifier. If this is the case, and if the one-time stamp was not received earlier at the inspection server, the inspection server sends an "authentication approved" signal 494 to the inspection terminal, together with the personalization data of the user as specified in the user profile and provided by the IDS 470. Dotted line 494' indicates a signal "authentication not approved", which would alternatively be issued to the inspection terminal if the one-time stamp had been user earlier, of if the biometric feature descriptors did not match.

In some applications it may be useful to also include the user terminal 410 in the system 400, though it is generally preferred that the user terminal does not form part of the system, but is merely provided with computer program instructions which allow the user terminal to present the appropriate information to the inspection terminal. The inspection server only communicates with authorized inspection terminals, and preferably uses encrypted communication channels for communication. As there is no transfer of information from the inspection server to user terminal 410, even in case the user terminal is lost or stolen, there is no risk of sensitive personalization data being extracted from user terminal.

FIG. 4 shows a flow chart of a method for registering a biometric feature descriptor of human recognizable visual representation of biometric data of a user to whom a tangible identity document has been issued, as well as a document identifier for uniquely identifying the tangible identity document and personalization information that is stored in the tangible identity document. In step 501 a document identification string is read out from the tangible identity document, e.g. using optical character recognition. This string may be used to access information that is stored in a chip of the tangible identity document in case the document is protected by means of basic access control (BAC). Next, in step 502 data stored in the chip is electronically read out, the data including personalization data as well as a human recognizable visual representation of biometric data of the user that is stored in the chip of the tangible identity document. The data that is electronically read out may also include a digital copy of document identification string which may optionally be compared against the document identification string that was read out in step 501 to ensure the chip and the tangible document match. In case these do not match, the registration method ends.

In step 503, the document identification string is send to a verification server, which checks whether the document associated with said string is still valid, e.g. has not expired and has not been reported as stolen or otherwise revoked. In step 505 this response is received, typically at the inspection server. Next, in step 505 a live image of the user is captured. This is done to so that it may be determined with a greater degree of certainty that the person for whom the biometric feature description and personalization data are being registered is indeed involved in the registration process. In step 506 a measure of difference between the captured live image and the human recognizable visual representation of the biometric data of the user that was electronically read out is calculated. This may be done in a manner known in the art of face recognition. In step 520 it is checked whether the difference measure is below a predetermined threshold and it is further checked whether the verification server indicated that the identity document associated with the identification string is valid. If either of these is not the case, registration is aborted. Otherwise, the method continues with a step 521 of generating a document identifier for uniquely identifying the identity document. This document identifier may be generated using a pseudorandom number generator and is independent from the document identification string in that the document identification string cannot be reconstructed from the document identifier. In step 522 a biometric feature descriptor is calculated from the electronically read out human-recognizable visual representation of the biometric data of the user. The feature descriptor is calculated in such a manner that it is not possible to reconstruct a human-recognizable visual representation of the biometric data of the user from the feature descriptor. In any case, the size of in bits the feature descriptor is orders of magnitude smaller than the size in bits of the electronically read out human recognizable visual representation of biometric data of the user. For instance, a user's ID photo may have a size of at least 200 kilobyte, whereas the feature descriptor typically has a size of 1000 bits or less. In step 523, the biometric feature descriptor and the personalization information to the inspection server and storing these together with the document identifier at the inspection server. In order to ensure that the user's mobile terminal can show information comprising the document identifier on its display, the document identifier is transmitted to a mobile terminal of the user in step 524.

In the method shown in the flow chart of FIG. 4, steps 501, 502, 504, 505, 506 and typically also 520 and/or 521, are carried out at a registration system that is different from the mobile user terminal. Generally, the registration system will be accessible only from a certified and trusted location, such a desk of a municipality where tangible identity documents are issued to users. This provides a high degree of security for the registration process and consequently a high degree of trust of authentication using the data registered in this manner.

For purposes in which a lower degree of trust of the authentication suffices, it is possible to carry out a considerable part of the registration process at the user's mobile terminal. This is illustrated in FIG. 5, in which steps 504 and 521-524 are the same as in FIG. 4. However, step 601 of reading the document identification string, e.g. using OCR, is carried out by the mobile user terminal. Likewise, step 602 of electronically reading our the personalization information and human recognizable visual representation is carried out by the mobile user terminal as well, e.g. using an NFC reader of the mobile user terminal. Step 603 comprises the mobile terminal sending the document identification string to the inspection server, which in turn forwards the identification string to the verification server and subsequently receives a response from the inspection server which indicates whether the identification document is valid or not. In case the response indicates that the identification method is not valid, registration aborted, and otherwise the method continues with step 504 of receiving the response from the verification server, which is typically carried out at the inspection server. Step 605 of capturing a live image of the user is carried out using a camera of the mobile user terminal, and step 606 of calculating a difference measure is also carried out at the mobile user terminal. In step 620 it is checked at the mobile user terminal whether the difference measure is below a predetermined threshold, and if this this is not the case, registration is aborted. Otherwise the registration process continues with steps 521-524.

In summary, the invention provides a method and system for authenticating a user based on a human-recognizable visual representation of biometric data of the user is captured using the digital camera, wherein a biometric feature descriptor is generated from the captured biometric data of the user, and the feature descriptor, together with a user selected user profile, is transmitted to an inspection server adapted for validating whether the transmitted biometric feature descriptor corresponds to a centrally stored biometric feature descriptor of biometric data of the user. If this is the case, the inspection server transmits an "authentication approved" signal together with user personalization data specified in the selected user profile to the inspection terminal.

The present invention has been described above with reference to a number of exemplary embodiments as shown in the drawings. Modifications and alternative implementations of some parts or elements are possible, and are included in the scope of protection as defined in the appended claims.

The invention claimed is:

1. A method, implemented with an inspection terminal equipped with a digital camera, of authenticating a user of a mobile user terminal that is equipped with a display, the method comprising:
   i) capturing, with the digital camera, information presented on the display of the user terminal, the information including each of:
      a human-recognizable visual representation of biometric data of the user,
      a document identifier that identifies an identity document that has been issued to the user,
      a user profile specifying a subset of personalization data derived from the identity document issued to the user, to be provided to the inspection terminal, and
      a one-time stamp;
   ii) calculating a biometric feature descriptor from the captured human-recognizable visual representation of the biometric data of the user, where the human-recognizable visual representation of biometric data of the user corresponds to an image of the user stored in said identity document of the user;
   iii) transmitting the captured document identifier, biometric feature descriptor, user profile, and the one-time stamp to an inspection server, the inspection server including or in communication with an Identity Document Server (IDS) which stores, for each identity document of a plurality of identity documents issued to different persons, personalization data about the person to which the identity document has been issued and an associated document identifier uniquely identifying the respective identity document, the inspection server configured to return a signal "authentication approved" together with a subset of the personalization data defined by the user profile, when
      i) the transmitted biometric feature descriptor corresponds to a biometric feature descriptor of biometric data stored in the IDS for an identity document for which the associated document identifier corresponds to the transmitted document identifier, and
      ii) the one-time stamp has not been received earlier for the transmitted document identifier; and
   iv) at the inspection terminal, waiting for the "authentication approved" signal, and upon receipt of said "authentication approved" signal, generating at least one of an audible and a visual signal indicating that authentication of the user has been approved.

2. The method according to claim 1, wherein step iv) further comprises, upon receipt of the "authentication approved" signal, displaying on a display of the inspection terminal, all or part of the subset of the personalization data which corresponds to the user profile.

3. The method according to claim 2, wherein the information on the user profile that is displayed on the user terminal is selected from a predetermined set of user profiles that is supported by the IDS.

4. The method according to claim 1, wherein any of the document identifier, the user profile, and the one-time stamp are presented on the display of the user terminal in at least one of a barcode and a QR-code format.

5. The method according to claim 1,
   wherein the one-time stamp includes a time code indicating a time and date the one-time stamp was generated at the user terminal, and
   wherein the inspection server only returns the "authentication approved" signal when the time code indicates that the one-time stamp was generated within a predetermined time period from receipt thereof at the inspection server.

6. The method according to claim 1, further comprising, in step iii), sending a unique identifier of the inspection terminal to the inspection server,
   wherein the inspection server comprises a list of unique identifiers of inspection terminals and associated kinds of personalization data each inspection terminal is allowed to receive, and
   wherein the inspection server is configured to return the signal "authentication approved" together with the subset of the personalization data defined by the user profile, only when the inspection terminal with the unique identifier is allowed to receive the personalization data indicated in the user profile.

7. The method according to claim 1, wherein the personalization data comprises the information on the person that is included in the identity document issued to the person, wherein the document identifier is not included in the identity document.

8. The method according to claim 1, further comprising: sending to the user terminal a signal indicative that the inspection server has received a document identifier which corresponds to the document identifier presented on the display of the user terminal.

9. The method according to claim 1, wherein the human-recognizable visual representation of biometric data of the user corresponds to an image of the user that is visually printed on the identity document.

10. The method according to claim 1, further comprising, prior to step i), issuing an identity document to the user and assigning a unique document identifier to the identity document, wherein the document identifier is not included in the identity document, and storing, at the Identity Document Server, personalization data corresponding to personalization data included in the identity document and the associated document identifier.

11. A non-transitory computer-readable medium on which is stored a computer program comprising instructions which, when executed by a processor of an inspection terminal, cause the processor to carry out the method of claim 1.

12. A method for presenting user authentication data on a user terminal equipped with a display, an input device, and a memory having stored therein each of biometric data of the user, a document identifier for identifying an identity document that has been issued to the user, and one or more user profiles, each user profile specifying a subset of personalization data derived from the identity document issued to the user, to be provided to the inspection terminal, the method comprising:
- presenting, on the display, multiple of the one or more user profiles;
- receiving, via the input device, input from the user on which user profile of the one or more user profiles is to be used; and
- presenting, on the display:
  - a human-recognizable visual representation of the biometric data of the user stored in the memory,
  - a machine-readable representation of the document identifier,
  - a machine-readable representation of the user profile to be used, and
  - a one-time stamp.

13. The method according to claim 12, wherein the one or more subsets of personalization data specified by the user profiles is not present in the memory of the user terminal that is accessed for carrying out the method.

14. A non-transitory computer-readable medium on which is stored a program comprising instructions which, when executed by a processor of a mobile user terminal, cause the processor to carry out the method of claim 12.

15. A system, comprising:
- an inspection server that includes or is in communication with an Identity Document Server that stores, for each identity document of a plurality of identity documents issued to different persons, personalization data about a person to which the identity document has been issued and an associated document identifier uniquely identifying the respective identity document; and
- an inspection terminal equipped with a digital camera and a display, the inspection terminal configured to:
  i) capture, with the digital camera, an image containing:
  - a human-recognizable visual representation of biometric data of the user,
  - a document identifier for identifying an identity document that has been issued to the user,
  - a user profile specifying a subset of personalization data derived from the identity document issued to the user, to be provided to the inspection terminal, and
  - a one-time stamp;
  ii) calculate a biometric feature descriptor from the captured human-recognizable visual representation of the biometric data of the user, wherein the human-recognizable visual representation of biometric data of the user corresponds to an image of the user stored in said identity document of the user; and
  iii) transmit the captured document identifier, biometric feature descriptor, user profile, and the one-time stamp to an inspection server, the inspection server configured to return a signal "authentication approved" together with a subset of the personalization data defined by the user profile, when
  - i) the transmitted biometric feature descriptor corresponds to a biometric feature descriptor of biometric data stored in the IDS for an identity document for which the associated document identifier corresponds to the transmitted document identifier, and
  - ii) the one-time stamp has not been received earlier for the transmitted document identifier;
  wherein the inspection terminal is configured to wait for the "authentication approved" signal, and upon receipt of said "authentication approved" signal, generate at least one of an audible and a visual signal indicating that authentication of the user for the specified authentication goal has been approved.

16. The system according to claim 15, wherein the inspection server does not store a copy of the human recognizable visual representation of biometric data of the user.

17. The system according to claim 15, wherein the biometric feature descriptor is calculated from the captured human-recognizable visual representation in such a manner that a human-recognizable visual representation of the user cannot be reconstructed from the biometric feature descriptor.

18. A method for registering, at an inspection server, a biometric feature descriptor of human recognizable visual representation of biometric data of a user to whom a tangible identity document has been issued, as well as a document identifier that uniquely identifies the tangible identity document and personalization information that is stored in the tangible identity document, the method comprising:
- reading out a document identification string from the tangible identity document;
- electronically reading out personalization information and a human recognizable visual representation of biometric data of the user that is stored in the identity document;
- sending the document identification string to a verification server, and receiving a response indicating whether the identity document associated with the document identification string is valid or not;
- capturing a live image of the user;
- calculating a difference measure indicative of a difference between the human recognizable visual representation of the biometric data of the user and the captured live image of the user; and
- when the difference measure is below a predetermined threshold and the identity document associated with the document identification string is valid, carrying out ire further steps of:
  - generating a document identifier for uniquely identifying the identity document, wherein the document identifier cannot be derived solely from data in the identification document;
  - calculating a biometric feature descriptor from the electronically read out human-recognizable visual representation of the biometric data of the user;
  - transmitting the biometric feature descriptor and the personalization information to the inspection server and storing these together with the document identifier at the inspection server; and
  - transmitting the document identifier to a mobile user terminal.

19. The method according to claim 18, wherein the steps of:
- reading out a document identification string from the tangible identity document;
- electronically reading out personalization information and a human recognizable visual representation of biometric data of the user that is stored in the identity document; and
- capturing a live image of the user;
- are carried out using the mobile user terminal.

20. The method according to claim 18, wherein the steps of:
- reading out a document identification string from the tangible identity document;
- electronically reading out a human recognizable visual representation of biometric data of the user that is stored in the identity document; and
- capturing a live image of the user;
- are carried out at a registration system that is different from the mobile user terminal.

21. The method according to claim 18, further comprising:
- receiving, from the mobile user terminal, an acknowledgement that the mobile terminal has received the document identifier.

22. The method according to claim 18, further comprising, after the step of capturing the live image of the user and prior to carrying out the further steps:
- generating a one-time registration code at the registration system or the inspection server and transmitting the one time registration code to the mobile user terminal;
- receiving, from the mobile user terminal, a message indicating whether the user has received the one time code and wishes to register the personalization data at the inspection server;
- receiving, from the mobile user terminal, a further live image of the user captured by the camera of the mobile user terminal; and
- calculating a further difference measure indicative of a difference between the human recognizable visual representation of the biometric data of the user and the captured further live image of the user,
- wherein the further steps of the method are carried out only when the further difference measure is below a further predetermined threshold and the message is received from the mobile user terminal within a predetermined time after generating the one-time registration code and indicated that the user received the one time code and wishes to register his personalization data at the inspection server.

* * * * *